United States Patent Office 3,822,239
Patented July 2, 1974

3,822,239
PROCESS FOR PREPARING LINEAR POLYESTERS
Kazuya Chimura, Kazuo Ito, Shunichi Takashima, Mizuo Shindo, and Yoshihiro Shimoshinbara, Otake, Japan, assignors to Mitsubishi Rayon Company Limited, Tokyo, Japan
No Drawing. Filed May 3, 1971, Ser. No. 139,959
Claims priority, application Japan, June 2, 1970, 45/46,918; June 3, 1970, 45/47,871, 45/47,872; June 9, 1970, 45/49,710; June 11, 1970, 45/50,613, 45/50,614; June 30, 1970, 45/57,029; Oct. 20, 1970, 45/92,294; Oct. 21, 1970, 45/92,642
The portion of the term of the patent subsequent to May 8, 1990, has been disclaimed
Int. Cl. C08g 17/015
U.S. Cl. 260—75 R        8 Claims

ABSTRACT OF THE DISCLOSURE

A process for preparing linear polyesters wherein polycondensation of glycol terephthalates is performed in the presence of antimony-containing catalyst and a compound selected from α-hydroxycarboxylic acid; α,β-dicarboxylic acid; sulfur-containing derivative of α-hydroxycarboxylic acid or α,β-dicarboxylic acid; and derivatives thereof such as ester, amide, acid anhydride, mixed acid anhydride or acid halide. Resultant polyesters exhibit excellent whiteness and transparency and therefore, are particularly useful for textile fibers and films.

---

The present invention relates to a process for preparing colorless linear polyesters and copolyesters by using an antimony-containing catalytic compound. More particularly, it relates to a process for preparing linear polyesters and copolyesters having improved whiteness and transparency, i.e. in which darkening or color formation inevitably caused by using only conventional catalytic antimony compounds are obviated, with an increased productivity by using α-hydroxycarboxylic acid; α,β-dicarboxylic acid; a sulfur-containing derivative of the acid; or an ester, amide, acid anhydride, mixed acid anhydride or acid halide, of the acid or the sulfur-containing derivative, in addition to an antimony-containing catalyst.

Linear polyethylene terephthalate and copolyesters containing an ethylene terephthalate chain as a main component are particularly useful for textile fibers, film or molded articles. These polyesters are normally prepared through two reaction stages, that is, the first stage wherein, for example, dialkyl terephthalate is subjected to esterinterchange with ethylene glycol or terephthalic acid is directly esterified with ethylene glycol to be converted into bis-β-hydroxyethyl terephthalate or a low molecular weight polymer thereof and the second stage wherein the bis-β-hydroxyethyl terephthalate or its low molecular weight polymer is polycondensed at high temperatures under reduced pressure to form a high molecular weight polyester. Selection of appropriate catalysts is essential to smoothly carry out both reactions in a reasonable time and to obtain a commercially valuable product. In other words, catalysts to be used have a great influence on not only productivity but also qualities of the resultant polymer such as whiteness, transparency, heat resistance, weathering resistance, stability at the time of processing and the like, as is well-known. Therefore, an elaborate consideration should be given to the selection of catalysts.

Referring to the second stage (polycondensation stage) catalysts, there are a number of known catalysts including various metallic and non-metallic compounds, among which, antimony compounds and germanium compounds are practically employed in the production of polyesters on the commercial scale. Antimony compounds have been used primarily because of their improved catalytic effect and low cost, but there is still a problem. That is, polyesters prepared by using conventional antimony compounds such as antimony trioxide are tinged with undesirable grey or greenish grey, which is due to the metallic antimony deposited by the reduction of the catalytic antimony compound during polycondensation, although the polyesters are superior in heat resistance and stability at processing. The color formation is particularly important in the case where polyesters are to be used as textile fibers, films and the like because it leads to a considerable reduction of transparency in the case of films and to a considerable reduction of whiteness in the case of textile fibers resulting in the deterioration of brilliancy in a dyeing process.

Thus, to avoid the problem, several new antimony catalysts have been heretofore proposed, including, for example, such pentavalent compounds as described in Japanese Patent Publications 10,847/1961 and 6,397/1964; pentavalent organoantimony compounds having the formula $R_3SbO$ or $R_3Sb(OH)_2$, as described in Japanese Patent Publication 15,999/1968; siloxy-antimony compound having the formula $(R_xR_yR_zSiO_m)_n$—Sb [III], as described in Japanese Patent Publication 351/1970; and antimony salts of aliphatic mono-carboxylic acid having at least 12 carbon atoms, as described in British Pat. 1,168,149.

These antimony compounds, however, while being effective for minimizing or avoiding the color formation or darkening of polyesters, have some disadvantages; the pentavalent antimony compounds readily cause side reactions to form undesirable products such as diethylene glycol, which is vigorous in comparison with trivalent antimony compounds; the pentavalent organoantimony compounds and the siloxy-antimony compounds are too expensive because of organometallic compounds; and the antimony salts of aliphatic monocarboxylic acid having at least 12 carbon atoms exercise a slightly less effect for minimizing the color formation than the pentavalent antimony compound and should be used in great amounts in comparison with trivalent antimony compounds to ensure the reasonable rate of polycondensation. Accordingly, these antimony compounds are also unsatisfactory as catalysts to be used in the manufacture of polyesters.

Fundamentally, in order to minimize the color formation or darkening of the polyesters, such antimony compounds wherein reduction potential thereof to metallic antimony can be maintained at a higher level during polycondensation than those of conventional trivalent antimony compounds, should be used. That is, antimony compounds to be used as a polycondensation catalyst should not have a tendency to be readily reduced in the polycondensation system. The above-mentioned antimony compounds satisfy such a prerequisite.

Thus, to avoid the above-mentioned and other problems, a process for preparing improved linear polyesters and copolyesters, which are substantially colorless and have excellent whiteness and transparency and therefore, particularly useful for the preparation of films and textile fibers, has now been found.

The process of the invention is one for preparing linear polyesters or copolyesters which comprises condensing glycol terephthalate such as ethylene glycol terephthalate, 1,4-butanediol terephthalate and 1,4-cyclohexanedimethanol terephthalate, or a blend of the glycol terephthalate with minor amounts of at least one copolycondensation component such as phthalate, isophthalate, adipate, succinate and 4-β-oxyethoxybenzoate of glycol, e.g. ethylene glycol, 1,4-butanediol or 1,4-cyclohexanediomethanol, in the presence of an antimony-containing polycondensation catalyst and at least one member selected from the group consisting of α-hydroxycarboxylic acid; α,β-dicarboxylic acid; a sulfur-containing derivative of α-hydroxycarboxylic acid or α,β-dicarboxylic acid, said derivative having been made by the substitution of at least one sulfur atom for at least one oxygen atom of the hydroxyl group or the carboxyl group of said acid; and ester, amide, acid anhydride, mixed acid anhydride or acid halide, of said acid or said sulfur-containing derivative; said member being present in such amounts that molar proportions of antimony atom contained in said polycondensation catalyst to said member unit preferably range 1:0.5 to 1:3.

The process of the invention produces polyesters or copolyesters possessing, by far, less darkness with a higher productivity in comparison with conventional processes wherein only a known antimony catalyst such as antimony trioxide and antimony acetate or the above-mentioned improved antimony catalysts such as pentavalent Sb compound is employed, i.e. without the compound of the present invention. These facts are surprising. The causes of the phenomena remaining unexplained are revealed, but it may be presumed that the phenomena are due to the fact that an antimony-containing catalyst and α-hydroxycarboxylic acid, α,β-dicarboxylic acid, a sulfur-containing derivative of the acid or a derivative thereof peculiarly interact on each other in a polycondensation system and consequently, heat stability of the catalyst component is maintained at a considerably high level during polycondensation. For example, an antimony salt of monocarboxylic acid, e.g. antimony acetate, when it is heated in ethylene glycol, is readily subjected to glycolysis to produce a free carboxylic acid; the carboxyl group bonded to Sb atom disappear. On the other hand, for example, a solution prepared by the incorporation of malic acid into an antimony trioxide solution in ethylene glycol, even after it is heated over a period of 10 hours at temperatures of 150 to 180° C., exhibits strong absorption bands at 1725 cm.$^{-1}$ and 1640 cm.$^{-1}$ according to the infrared analysis, both absorptions being due to the asymmetric stretching vibration of —COO— group. Particularly, the latter absorption, which is due to a —COO— group directly bonded with an antimony atom, shows the possibility that the antimony catalyst has been changed into a compound having excellent stability against both heat and glycolysis, such as, for example

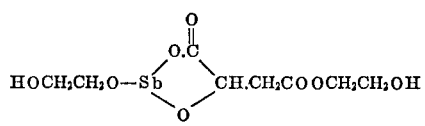

by the addition of malic acid, and further, the stability is maintained all through the polycondensation.

It may also be presumed that the high productivity of polyesters in the present invention is due to the fact that, as the antimony catalyst is transformed into such a stable compound as mentioned above, amounts of antimony to be reduced during the polycondensation are by far the least and consequently, an actually effective concentration of the antimony catalyst is considerably high.

Glycol terephthalates, which are to be condensed according to the present invention, may be prepared by the direct esterification of terephthalic acid with glycol or the ester-interchange of a lower dialkyl ester of terephthalic acid with glycol in a usual manner. Suitable glycols to be used for the esterification or the ester-interchange are those having 2 to 16 carbon atoms, which include, for example, ethylene glycol, 1,4-butanediol, 1,4-cyclohexane-dimethanol and mixtures thereof. The esterification or ester-interchange of glycols, which is a precursory process of the polycondensation of the present invention, can be performed in normal manners in the presence of various known catalysts.

Glycol terephthalate to be condensed according to the present invention, may be used alone or as an admixture with each other or with minor amounts of copolycondensation components such as phthalic acid, isophthalic acid, adipic acid, succinic acid, 4-β-oxyethoxybenzoic acid, 1,4-butanediol, cyclohexane-1,4-dimethanol and the like.

Antimony-containing polycondensation catalysts to be used in the present invention include known catalysts, which are soluble in the polycondensation system; for example, antimony trioxide; antimony halide such as antimony chloride, antimony bromide and antimony fluoride; antimony sulfide; antimonic acid and metal salt thereof such as Ca antimonate, Mg antimonate, Zn antimonate, Mn antimonate, etc.; antimonous acid and metal salt thereof such as Ca antimonite, Mg antimonite, Zn antimonite, Mn antimonite, etc.; antimony glycoxide such as antimony ethylene glycoxide, antimony propylene glycoxide, antimony butylene glycoxide and the like; antimony phenoxide; antimony alkoxide such as antimony ethoxide, antimony methoxide, antimony propoxide, antimony butoxide and the like; and antimony carboxylate such as antimony acetate, antimony propionate, antimony butyrate, antimony formate, antimony benzoate, antimony toluylate and the like. Typical antimony compounds are antimony trioxide, antimony acetate, antimony ethoxide and antimony ethylene glycoxide.

α-hydroxycarboxylic acids, which are used together with an antimony-containing catalyst in the present invention, include those having 2 to 30 carbon atoms. But, those which have either a total of at least three hydroxyl and carboxyl groups or at least one aromatic ring in the α-position in relation to the carboxyl group, are particularly preferred in the present invention. Preferable α-hydroxycarboxylic acids include, for example, malic acid, citric acid, tartaric acid, gluconic acid, tartronic acid, methyltartronic acid, α-methylmalic acid, α-hydroxy-α'-methylsuccinic acid, α-hydroxy-α,α'-dimethylsuccinic acid, trimethylmalic acid, α-hydroxyglutaric acid, 4-hydroxypentane-1,3,4-tricarboxylic acid, glyceric acid, α,β-dihydroxyisobutyric acid, α-methyltartaric acid, α,β-dihydroxyglutaric acid, 2,3,4-trihydroxybutyric acid, dihydroxyfumaric acid, benzilic acid, α-phenyllactic acid and the like. Other α-hydroxycarboxylic acids having 2 to 30 carbon atoms such as glycollic acid, α-hydroxyisobutyric acid, α-hydroxyvaleric acid, α-hydroxylauric acid, α-hydroxystearic acid and the like, may also be used.

α,β-dicarboxylic acids, which are used together with an antimony-containing catalyst in the present invention, include those represented by the following formulae;

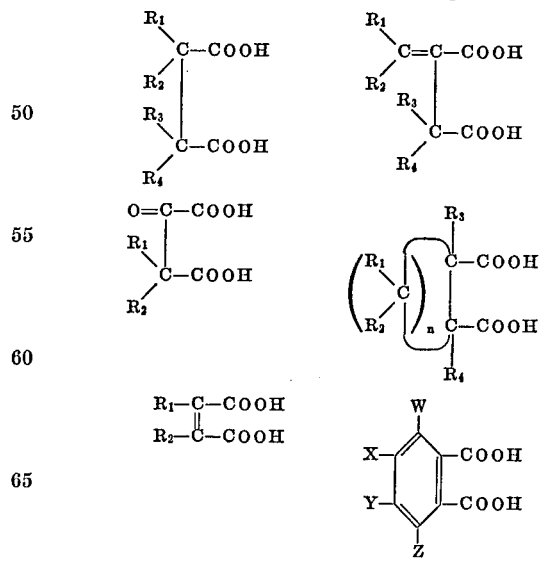

wherein $R_1$, $R_2$, $R_3$ and $R_4$ are identical with or different from each other and selected from a hydrogen atom and unsubstituted or substituted alkyl, cycloalkyl, aryl, aralkyl, allyl and alkoxyl group, said substituted groups having a substituent selected from carbonyl group, halogen and carboxyl group; W, X, Y and Z are identical with or different from each other and selected from a hydrogen atom and alkyl, hydroxyl and carboxyl groups; and $n$ is an integer of at least 1.

Such $\alpha,\beta$-dicarboxylic acids include, for example, those represented by the formulae;

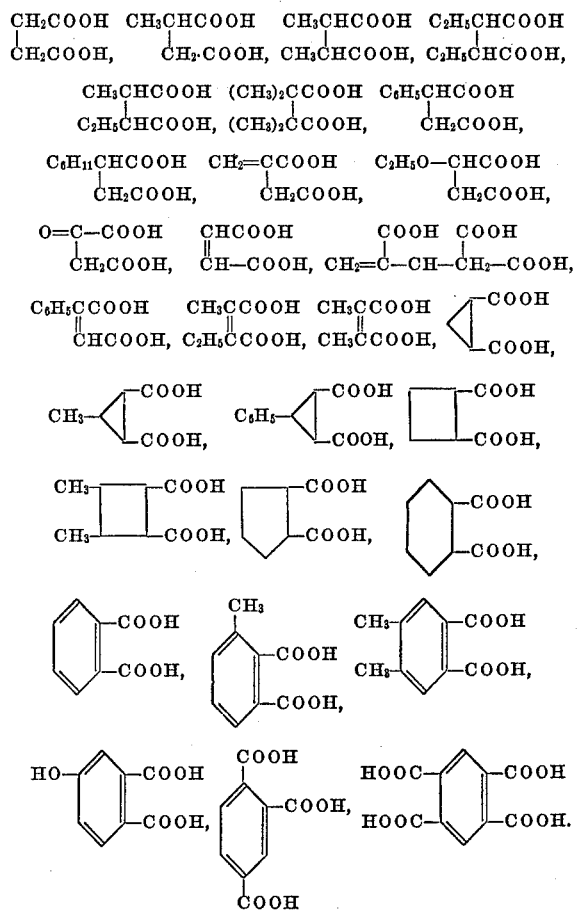

Sulfur-containing derivatives of $\alpha$-hydroxycarboxylic acid or $\alpha,\beta$-dicarboxylic acid, which have been prepared by the substitution of at least one sulfur atom for at least one oxygen atom of the hydroxy group or the carboxylic group of the $\alpha$-hydroxycarboxylic acid or the $\alpha,\beta$-dicarboxylic acid, are also used in addition to an antimony-containing poly-condensation catalyst in the present invention.

Sulfur-containing derivatives of $\alpha$-hydroxycarboxylic acid having been prepared by the substitution of at least one sulfur atom of the hydroxyl group or the carboxyl group of the acid include, for example, those represented by the formulae;

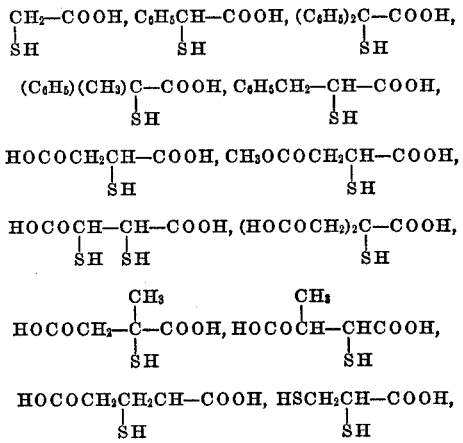

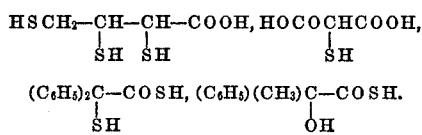

Sulfur-containing derivatives of $\alpha,\beta$-dicarboxylic acid, which have been prepared by the substitution of at least one sulfur atom for at least one oxygen atom of the carboxyl groups of the acid, include, for example, those represented by the formulae;

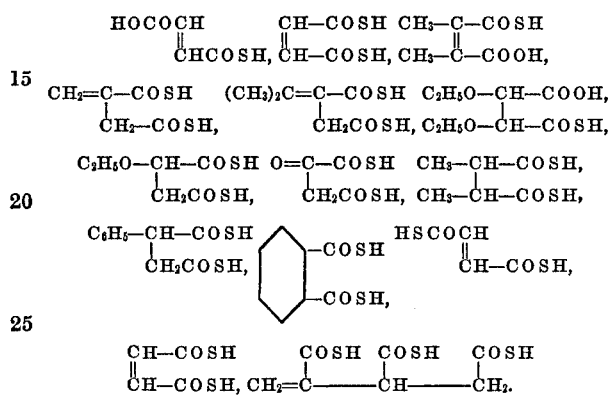

Functional derivatives of the above-listed $\alpha$-hydroxycarboxylic acid, $\alpha,\beta$-dicarboxylic acid and sulfur-containing derivatives are also used in addition to an antimony-containing catalyst in the present invention. Typical derivatives are ester, the alcohol comopnent having 1–12 carbon atoms; amide; acid anhydride and mixed acid anhydried; acid halide and the like.

Such derivatives of $\alpha$-hydroxycarboxylic acid or sulfur-containing derivatives of $\alpha$-hydroxycarboxylic acid include, for example, those represented by the formulae;

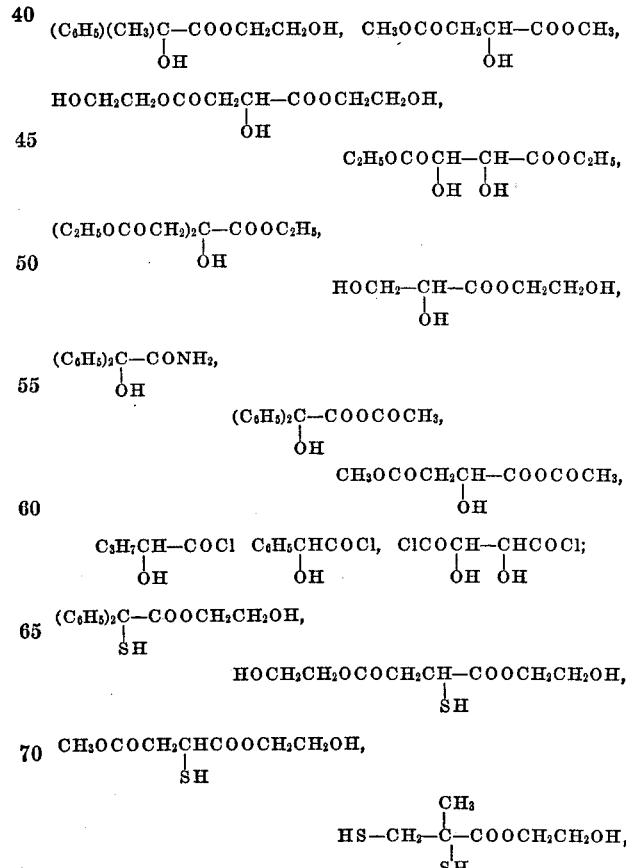

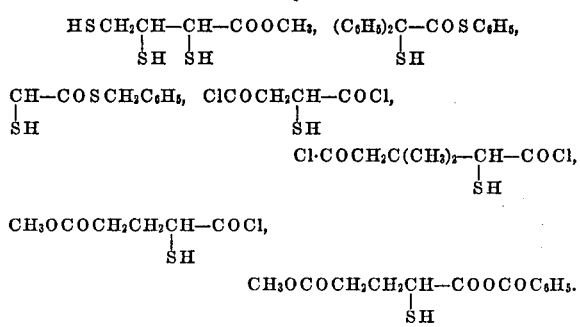

Derivatives of α,β-dicarboxylic acid or sulfur-containing derivatives of the acid to be used in the present invention include, for example, those represented by the formuale;

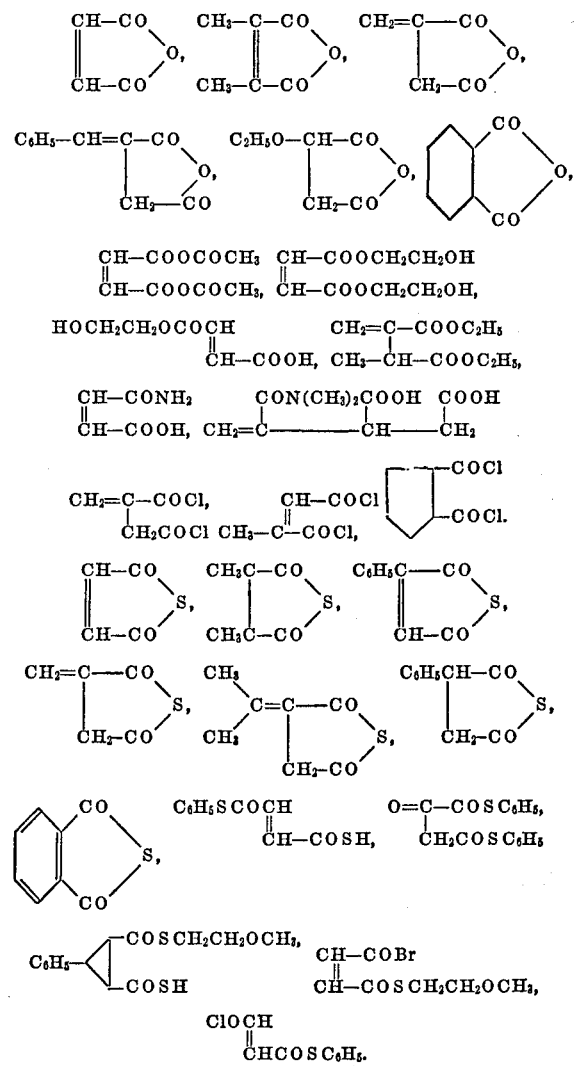

It is to be understood that the compounds to be used together with an antimony-containing catalyst in the present invention is not limited to those exemplified above. It is also to be understood that those compounds may be in any type of both optical active and inactive.

Those compounds may be employed alone or as a mixture between them. The method of the incorporation of those compounds into the polycondensation system is not critical; they may be directly incorporated as they are, or more preferably, they may be incorporated as a solution dissolved in an antimony catalyst solution in ethylene glycol, as mentioned hereinafter.

Used amounts of those compounds depend upon the used amounts of an antimony-containing catalyst. In order to achieve the greatest effect, that is, to obivate the color formation or darkening of the resulting polymers without deteriorating other qualities of same, those compounds are preferably used in such proportions that a molar ratio of those compounds to an anitmony atom contained in the antimony catalyst does not exceed 3. The use of those compounds in excess of the above limit leads to a considerable reduction of heat stability and discoloration, e.g. yellowing, of the polymer. On the other hand, when a molar number of those compounds is less than that of the antimony atom, the color formation or darkening of the polymer gradually increase with a decrease of the molar ratio. Particularly, when the molar ratio drops below one half, the darkening is conspicuous. Therefore, a molar ratio of those compounds to the antimony atom ranges preferably 0.5:1 to 3:1, and most preferably is 1:1.

Catalytic antimony compounds may be used for the poly-condensation in normal manners. They may be added to the reaction mixture at any stage from the time before the first stage esterification or ester-interchange commences to the time while the second stage polycondensation is going on, and in any form, i.e. as a solution in ethylene glycol, a slurry in ethylene glycol or a solid form. Preferable amounts of the catalytic antimony compound to be added to the reaction system are from 0.005 to 0.5% by weight, based on the weight of the resulting polyester.

In a most preferable embodiment of the present invention, both components of catalytic antimony compound and the above-listed compound are added in a form of solution or slurry in glycol such as ethylene glycol, propylene glycol and 1,4-butanediol, particularly as a solution, which is prepared by dissolving the above-listed compound into a catalytic antimony compound (such as antimony trioxide and antimony acetate) solution in ethylene glycol in such a proportion that a molar ratio of antimony atom contained in the catalytic antimony compound to the above-listed compound is 1:1, to glycol terephthalate, produced by the esterification or ester-interchange catalyst is inactivated by the addition of phosphorus compounds, but before polycondensation commences. Then, the reaction mixture is polycondensed in usual manners.

Preferable phosphorus compounds to be added to inactivate the esterification or ester-interchange catalyst are lower alcohol esters of pentavalent phosphoric acid or reaction products of the esters and ethylene glycol. Trivalent phosphorus compounds are not preferable because these compounds have a high reducing power and therefore, in case they are present in the polycondensation system, reduce the antimony catalyst, which possibly leads to some darkening of the resulting polyesters. The catalytic antimony compound of the present invention appears to exhibit a remarkably high reduction potential to metallic antimony in the polycondensation system in comparison with those of conventional catalytic antimony compounds such as antimony trioxide and antimony acetate and therefore, even in the case where trivalent phosphorus compounds are used together, it results in polyesters of less darkening than those from the conventional antimony catalysts. However, the darkening of polyesters obtained in the latter case is, of course, somewhat serious in comparison with that of the case where the pentavalent phosphorus compounds are used.

Further, in addition to the above-mentioned compound and the catalytic antimony compound, other polycondensation catalysts may be employed in the present invention. The polycondensation catalysts include, for example, compounds containing zinc, silicone, germanium, cobalt, tin, lead, titanium and the like, among which germanium compounds and cobalt compounds are most preferable because their addition together with the antimony catalyst system of the present invention results in polyesters possessing excellent whiteness and transparency with high productivity.

Suitable germanium compounds include, for example, amorphous or crystal germanium dioxide, an eutectic mixture of crystal germanium dioxide and antimony trioxide, germanium glycoxide such as germanium ethylene glycoxide, germanium alkoxide and its derivatives such as germanium ethoxide, germanium carboxylate such as the acetate, germanium tetrahalide such as the tetrachloride and other known germanium compounds being readily and uniformly soluble in ethylene glycol or in the reaction mixture. These compounds are preferably employed in the form of, for example, amorphous germanium dioxide, solid such as finely powdered crystal germanium dioxide having an average particle size of no more than $3\mu$; an aqueous solution; an ethylene glycol solution being prepared by replacing the medium of an aqueous germanium solution or by directly dissolving germanium compounds in ethylene glycol in the presence of alkali metal salt or alkaline earth metal salt.

Suitable cobalt compounds include, for example, carboxylic acid salts such as cobalt formate, cobalt acetate, cobalt benzoate, cobalt stearate and the like; acethylacetonato cobalt, cobalt chloride, cobalt bromide, cobalt nitrate or cobalt sulfate. Amounts of these metal catalyst to be used in combination with the antimony catalyst of the present invention are not critical. Further, various additives such as stibilizer, pigment, delustrant and the like may be employed in the polycondensation.

To sum up, a method according to the present invention produces polyesters possessing, by far, less darkness in comparison with those of conventional method wherein known antimony catalysts, e.g. antimony trioxide and antimony acetate are used alone, with a high productivity.

The invention will be further illustrated with reference to examples, in which "parts" and "percent" are both "by weight" unless otherwise specified and intrinsic viscosity $[\eta]$ of polymers was determined in a mixture solvent of tetrachloroethane and phenol (1:1) at a temperature of 25° C., and content of diethylene glycol (DSG) in polymers was determined by gas chromatography of hydrolyzed polymers.

Both luminous reflectance, represented by Y value, and excitation purity, represented by PI value, of polymers were determined as follows: The sample polymer was spun and drawn in a normal manner to form filaments having a fineness of 75 d./36 fils. The filament test specimen was illuminated by a substantially unidirectional beam in an automaitc recording spectrophotometer (manufactured by Hitachi Seisakusho, Japan; Model EPR–2). Reflectance was measured on the test specimen and the magnesium oxide standard white surface, the latter being used as a standard.

Example 1

10,000 parts of dimethyl terephthalate and 7,500 parts of ethylene glycol were heated at temperatures of 150 to 220° C. under an atmosphere of nitrogen in the presence of 6 parts of magnesium acetate to effect ester-interchange while methanol, produced therefrom, was continuously distilled off from the reaction mixture. The reaction was completed three hours after its initiation. The reaction product was then distilled by heating to remove an excess of ethylene glycol therefrom.

A solution of 3.2 parts of trimethyl phosphate in ethylene glycol was then added at a temperature of 240° C. to the reaction product, and followed by the addition of a catalytic antimony compound solution, which was prepared as follows; 4.6 parts of malic acid was added to a solution of 5 parts antimony trioxide dissolved in 200 parts of ethylene glycol by heating (a molar ratio of malic acid to Sb atom was 1/1), followed by agitation with the temperature being maintained at 120° C. for 5 hours. The reaction mixture was then vacuumed by degrees and finally, polycondensed at a temperature of 285° C. and a pressure of 2 mm. Hg over a period of 2 hours.

The resultant polymer had a melting point of 261° C. and an intrinsic viscosity $[\eta]$ of 0.771. The polymer, was transparent with a very slightly yellow tinge but little or no darkening. Filaments, obtained therefrom by spinning and drawing, were characterized as having a Y value of 88.3% and a PI value of 98.9% and exhibiting excellent whiteness and luster.

Control Example 1

A process of Example 1 was repeated under the same conditions as those in Example 1 except that polycondensation was performed without adding malic acid.

The resultant polymer exhibited dark grey and a melting point of 260.5° C. and an intrinsic viscosity $[\eta]$ of 0.669, apparently showing that the polymer was by far inferior in the tone and the polycondensation rate was somewhat lower than that in Example 1. Filaments, obtained therefrom, were characterized as having a Y value of 78.3% and a PI value of 98.2% and exhibiting a considerably great darkness in comparison with those of Example 1.

Example 2

A process of Example 1 was repeated under the same conditions as those in Example 1 except for added amounts of malic acid being 2.3 parts i.e. a molar ratio of maleic acid to Sb atom being 1/2, in place of 4.6 parts.

The resultant polymer had a melting point of 261° C. and an intrinsic viscosity $[\eta]$ of 0.750, and had superior whiteness with little or no yellow tinge, but very slight darkening. Filaments, formed therefrom, were characterized as having a Y value of 86.6% and a PI value of 99.4% and exhibiting excellent luster and whiteness.

Example 3

A process of Example 1 was repeated under the same conditions as those in Example 1 except for added amounts of malic acid being 9.2 parts, i.e. a molar ratio of malic acid to Sb atom being 1/2, in place of 4.6 parts.

The resultant polymer had a melting point of 259.5° C. and an intrinsic viscosity $[\eta]$ of 0.736, and a slightly yellow tinge, but little or no darkening. Filaments, formed therefrom, were characterized as having a Y value of 85.6% and a PI value of 97.4% and being light with a slight yellow tingle.

Example 4

Using 7.2 parts of citric acid monohydrate (a molar ratio of citric acid to Sb atom was 1/1 in place of malic acid, a process of Example 1 was repeated with all other conditions remaining the same.

The resultant polymer had a melting point of 260.5° C. and an intrinsic viscosity $[\eta]$ of 0.758 and was transparent with a slightly yellow tingle but little or no darkening. Fliments, formed therefrom, were characterized as having a Y value of 88.8% and a PI value of 98.2% and exhibiting excellent luster and white.

Example 5

Using 3.6 parts of citric acid monohydrate (a molar ratio of citiric acid to Sb atom was 1/2) in place of malic acid, a process of Example 1 was repeated with all other conditions remaining the same.

The resultant polymer had a melting point of 262° C. and an intrinsic viscosity $[\eta]$ of 0.766 and excellent whiteness with little or no yellow tinge. Filaments, formed therefrom, were characterized as having a Y value of 89.2% and a PI value of 99.4% and exhibiting excellent luster and whiteness.

Example 6

Using 2.57 parts of tartaric acid (a molar ratio of tartaric acid to Sb atom was 1/2) in place of malic acid, a process of Example 1 was repeated with all other conditions remaining the same.

The resultant polymer had a melting point of 260° C. and an intrisic viscosity [η] of 0.757 and excellent whiteness with a very slight yellow tingle. Filaments, formed therefrom, were characterized as having a Y value of 88.8% and a PI value of 99.11% and exhibiting excellent luster and whiteness.

Example 7

9,000 parts of dimethyl terephthalate, 1,000 parts of dimethyl isophthalate and 7,500 parts of ethylene glycol were mixed and followed by the addition of 5 parts of calcium acetate at a temperature of 150° C. The mixture was heated at temperatures of 150 to 220° C. over a period of 3 hours to perform ester-interchange. The reaction product was then distilled to remove an excess of ethylene glycol with the temperature being increased to 240° C.

A solution of 2.3 parts trimethyl phosphate in ethylene glycol was then added to the reaction product, and followed by the addition of a catalytic antimony compound solution, prepared as follows; 2.76 parts of malic acid was added to a solution of 6.1 parts antimony acetate in 150 parts of ethylene glycol by heating (a molar ratio of malic acid to Sb atom was 1/1). The reaction mixture was vacuumed by degrees with the temperature being increased and finally, polycondensed at a temperature of 285° C. and a pressure of 2mm. Hg over a period of two hours.

The resultant polymers had an intrinsic viscosity [η] of 0.693 and excellent transparency and whiteness. Filaments, formed therefrom, were characterized as having a Y value of 90.4% and a PI value of 99.6%.

For purposes of comparison, the above polycondensation was repeated without adding malic acid. The resultant polymer was tinged with dark grey.

Example 8

Using 10,000 parts of dimethyl terephthalate, 8,000 parts of ethylene glycol and 3 parts of manganese acetate, ester-interchange was repeated in the same manner as that of Example 1.

After the completion of ester-interchange, the reaction product was distilled to remove an excess of ethylene glycol therefrom with the temperature being increased, and followed by the addition of a solution of 3.5 parts trimethyl phosphate in ethylene glycol. Then, a catalytic antimony compound solution, prepared as mentioned below, was added to the mixture.

The catalytic antimony compound solution was prepared as follows: 4 parts of antimony trioxide was dissolved in 200 parts of ethylene glycol by heating. To the solution, and α-hydroxyglutaric acid solution, which was prepared by dissolving 4 parts of the acid in 100 parts of ethylene glycol at room temperature, was added (a molar ratio of the acid to Sb atom was 1/1), and followed by the agitation at a temperature of 150° C. for 5 hours.

The reaction mixture containing the catalytic antimony compound solution was vacuumed by degrees with the temperature being gradually increased and finally, polycondensed at a temperature of 285° C. and a pressure of 2 mm. Hg over a period of two hours.

The resultant polymer had a melting point of 261° C. and an intrinsic viscosity [η] of 0.767 and superior whiteness with little or no darkening. Filaments, formed therefrom were characterized as having a Y value of 88.8% and a PI value of 99.1% and exhibiting excellent whiteness and luster.

Example 9

Using 2.9 parts of glyceric acid (a molar ratio of glyceric acid to Sb atom was 1/1) in place of α-hydroxyglutaric acid, a process of Example 8 was repeated with all other conditions remaining the same.

The resultant polymer had a melting point of 260° C. and an intrinsic viscosity [η] of 0.762 and exhibited little or no darkening. Filaments, formed therefrom, were characterized as having a Y value of 87.2% and a PI value of 98.7% and exhibiting excellent luster and whiteness.

Example 10

Using 4 parts of α-methylmalic acid (a molar ratio of α-methylmalic acid to Sb atom was 1/1) in place of α-hydroxyglutaric acid and further, adding a dispersion of 50 parts of titanium oxide in 200 parts of ethylene glycol to the reaction mixture after the completion of ester-interchange, a process of Example 8 was repeated with all other conditions remaining the same.

The resultant polymer had a melting point of 261.5° C. and an intrinsic viscosity [η] of 0.777 and superior whiteness. Filaments, formed therefrom, were characterized as having a Y value of 90.2% and a PI value of 99.1% and exhibiting excellent luster and whiteness.

Example 11

A mixture of 1,000 parts of terephthalic acid and 715 parts of ethylene glycol was charged into an autoclave with a distillation apparatus. The mixture was heated, while being stirred, under an atmosphere of nitrogen. When the pressure of the mixture reached 3 kg./cm.² with an increase of the temperautre, a distilling valve was opened to remove water thus produced, and the esterification was performed at a temperature of 220° C. over a period of 3 hours with the removal of water.

On the other hand, a catalytic antimony compound solution was prepared as follows: 0.4 parts of antimony trioxide was dissolved in 20 parts of ethylene glycol by heating. To the solution, a malic acid solution, which was prepared by dissolving 0.37 parts of the acid in 5 parts of ethylene glycol at a room temperature, was added and followed by the agitation at a temperature of 180° C. for 3 hours.

After the catalytic antimony compound solution was added to the reaction system, as mentioned above, the reaction system was vacuumed by degrees with the temperature being increased and finally, polycondensation was performed at a temperature of 285° C. and a pressure of 2 mm. Hg for 1.5 hours.

The resultant polymer had a melting point of 256° C. and an intrinsic viscosity [η] of 0.712 and was light with a slightly yellow tinge but little or no darkening.

Example 12

Using 7.8 parts of benzilic acid (a molar ratio of the acid to Sb atom was 1/1) in place of malic acid, a process of Example 1 was repeated with all other conditions remaining the same.

The resultant polymer had a melting point of 261° C. and an intrinsic viscosity [η] of 0.774 and excellent whiteness with little or no darkening. Filaments, formed therefrom, were characterized as having a Y value of 88.1% and a PI value of 98.9% and exhibiting excellent luster and whiteness.

Example 13

Using 10.3 parts of α-hydroxystearic acid (a molar ratio of the acid to Sb atom was 1/1) in place of malic acid, a process of Example 1 was repeated with all other conditions remaining the same.

The resultant polymer had a melting point of 260° C. and an intrinsic viscosity [η] of 0.722 and an extremely light color but very slight darkening. Filaments, formed therefrom, were characterized as having a Y value of 85.2% and a PI value of 98.7%.

Example 14

10,000 parts of dimethyl terephthalate and 7,500 parts of ethylene glycol were heated at temperatures of 150 to 220° C. under an atmosphere of nitrogen in the presence of 6 parts of magnesium acetate to perform ester-interchange while methanol, produced therefrom, was continuously distilled off from the reaction mixture. Esterinterchange was completed three hours after its initiation. An excess of ethylene glycol was then distilled off from the reaction product with the temperature being increased.

To the reaction product, a solution was added at a temperature of 240° C., which solution was prepared by reacting 3.2 parts of trimethyl phosphate with 100 parts of ethylene glycol at a temperature of 175° C., while methanol, thus produced, was distilled off from the reaction mixture. Then, a catalytic antimony compound solution, prepared as mentioned below, and a solution of 0.2 parts amorphous germanium dioxide in 20 parts of ethylene glycol were added to the reaction mixture. The reaction mixture was vacuumed by degrees and finally, polycondensed at a temperature of 280° C. and a pressure of 2 mm. Hg over a period of two hours.

The catalytic antimony compound solution was prepared as follows: A solution of 3.7 parts malic acid dissolved in 50 parts of ethylene glycol at room temperature was added to a solution of 4 parts of antimony trioxide in 150 parts of ethylene glycol (a molar ratio of malic acid to Sb atom was 1/1) and followed by the agitation over a period of 5 hours with the temperature being maintained at 120° C.

The resultant polymer had an intrinsic viscosity $[\eta]$ of 0.776 and DEG of 0.61% and was colorless, transparent. Filaments, obtained therefrom, were characterized as having a Y value of 91.3% and a PI value of 99.7% and exhibiting excellent luster and whiteness.

Example 15

Without adding amorphous germanium dioxide, a process of Example 14 was repeated with all other conditions remaining the same.

The resultant polymer had an intrinsic viscosity $[\eta]$ of 0.744 and DEG of 0.60% and was tinged slightly yellow but little or no dark. Filaments, formed therefrom, were characterized as having a Y value of 87.8% and a PI value of 98.4% and a slightly yellow tinge in comparison with those in Example 14.

Example 16

Using 2.9 parts of citric acid monohydrate (a molar ratio of citric acid to Sb atom was 1/2) in place of malic acid, a process of Example 14 was repeated with all other conditions remaining the same.

The resultant polymer had an intrinsic viscosity $[\eta]$ of 0.784 and DEG of 0.59% and was colorless and transparent. Filaments, formed therefrom, were characterized as having a Y value of 90.9% and a PI value of 99.6% and exhibiting excellent whiteness and luster.

Example 17

Using 5.8 parts of citric acid (a molar ratio of the acid to Sb atom was 1/1) in place of malic acid, a process of Example 14 was repeated with all other conditions remaining the same.

The resultant polymer had an intrinsic viscosity $[\eta]$ of 0.769 and DEG of 0.60% and wash colorless, transparent. Filaments, formed therefrom, were characterized as having a Y value of 91.2% and a PI value of 99.6% and exhibiting excellent luster and whiteness.

Example 18

Using 2 parts of tartaric acid (a molar ratio of the acid to Sb atom was ½) in place of malic acid, a process of Example 14 was repeated with all other conditions remaining the same.

The resultant polymer had an intrinsic viscosity $[\eta]$ of 0.766 and DEG of 0.58% and was colorless and transparent. Filaments, formed therefrom, were characterized as having a Y value of 90.3% and a PI value of 99.3% and exhibiting excellent luster and whiteness.

Examples 19-21

Without adding amorphous germanium dioxide, processes of Examples 16-18 were repeated with all other conditions remaining the same. Characteristics of the resultant polymers and filaments are shown in Table 1.

TABLE 1

| Example number | $[\eta]$ | Percent DEG | Y value | PI value | Color tone of polymer |
|---|---|---|---|---|---|
| 19 | 0.735 | 0.60 | 87.4 | 98.5 | Slightly yellow. |
| 20 | 0.731 | 0.57 | 87.6 | 98.5 | Do. |
| 21 | 0.736 | 0.58 | 87.2 | 98.3 | Slightly yellowish green. |

Example 22

Using a solution, which was prepared by dissolving 0.2 part of commercially available crystal germanium dioxide in 20 parts of ethylene glycol in the presence of 0.17 part of calcium acetate while being heated with agitation over a period of 3 hours, in place of an amorphous germanium dioxide, solution a process of Example 16 was repeated with all other conditions remaining the same.

The resultant polymer had an intrinsic viscosity $[\eta]$ of 0.792 and DEG of 0.59% and was colorless and transparent. Filaments, formed therefrom, were characterized as having a Y value of 90.7% and a PI value of 99.5% and exhibiting excellent whiteness and luster.

Example 23

Using a 0.5% germanium dioxide solution in ethylene glycol, which was prepared by dissolving 0.2 parts of commercially available crystal germanium dioxide in 40 parts of water at a temperature of 100° C. and then, adding 50 parts of ethylene glycol to the solution and heating the resulting mixture to distill off water together with minor amounts of ethylene glycol from the mixture, in place of an amorphous germanium dioxide solution, a process of Example 16 was repeated with all other conditions remaining the same.

The resultant polymer had an intrinsic viscosity $[\eta]$ of 0.772 and DEG of 0.58%. Filaments, formed therefrom, were characterized as having a Y value of 90.8% and a PI value of 99.6% and exhibiting excellent whiteness and luster.

Example 24

Using the aqueous solution of commercially available germanium dioxide, mentioned in Example 23, as it is, a process of Example 23 was repeated wtih all other conditions remaining the same.

The resultant polymer had an intrinsic viscosity $[\eta]$ of 0.767 and DEG of 0.61%. Filaments, formed therefrom, were characterized as having a Y value of 90.6% and a PI value of 99.5% and exhibiting excellent luster and whiteness.

Example 25

10,000 parts of dimethyl terephthalate and 7,500 parts of ethylene glycol were heated at temperatures of 150 to 220° C. under an atmosphere of nitrogen for 3 hours in the presence of 7 parts of calcium acetate to perform ester-interchange. Then an excess of ethylene glycol was distilled off from the reaction product with the temperature being increased. Thereafter, a solution, which was prepared by treating 3.3 parts of trimethyl phosphate with 100 parts of ethylene glycol at a temperature of 170° C., was added to the reaction product, further followed by the addition of a catalytic antimony compound solution.

The catalytic antimony compound solution was prepared as follows: 4 parts of antimony trioxide and 0.3 parts of crystal germanium dioxide fine powder having an average diameter of 2.4μ were simultaneously dissolved in 200 parts of ethylene glycol by heating. Then, a malic acid solution, prepared by dissolving 3.7 parts of malic acid (a molar ratio of the acid to Sb atom was 1/1) in 50 ml. of ethylene glycol at room temperature, was added to the solution and followed by the agitation at a temperature of 150° C. for 5 hours.

Then, the above reaction mixture was vacuumed by degrees and finally, polycondensed at a temperature of 280° C. and a pressure of 2 mm. Hg over a period of 2 hours.

The resultant polymer had an intrinsic viscosity $[\eta]$ of 0.788 and DEG of 0.61% and was extremely white. Filaments, formed therefrom, were characterized as having a Y value of 90.6% and a PI value of 99.6% and exhibiting excellent luster and whiteness.

For comparison purposes, the above process was repeated in the same conditions as those mentioned above except for the absence of the crystal germanium dioxide fine powder. The resultant polymer had an intrinsic viscosity $[\eta]$ of 0.740 and DEG of 0.60%. Filaments, formed therefrom, were characterized as having a Y value of 87.1% and a PI value of 98.4% and a very slightly yellow tinge.

Example 26

Using 0.7 parts of germanium tetraethoxide in place of crystal germanium dioxide fine powder, a process of Example 25 was repeated with all other conditions remaining the same.

The resulting polymer had an intrinsic viscosity $[\eta]$ of 0.779 and DEG of 0.62%. Filaments, formed therefrom, were characterized as having a Y value of 91.0% and a PI value of 99.5% and excellent luster and whiteness.

Example 27

To an ester-interchange reaction product being the same as that obtained in Example 16, a solution, which was prepared by treating 3.2 parts of trimethyl phosphate with 100 parts of ethylene glycol at a temperature of 170° C., was added and followed by the addition of a catalytic antimony compound solution, prepared as mentioned below, and a solution of 2 parts amorphous germanium dioxide in 100 parts of ethylene glycol.

The catalytic antimony compound solution was prepared as follows: A solution of 2.8 parts malic acid (a molar ratio of the acid to Sb atom was 1/1) dissolved in 50 parts of ethylene glycol at a room temperature was added to a solution of 6 parts antimony acetate (Sb content of which corresponds to 3 parts of antimony trioxide) in 150 parts of ethylene glycol and followed by the agitation over a period of 5 hours with the temperature being maintained at 120° C.

The above reaction mixture was vacuumed by degrees and finally, polycondensed at a temperature of 280° C. and a pressure of 2 mm. Hg for one hour.

The resultant polymer had an intrinsic viscosity $[\eta]$ of 0.747 and DEG of 0.96% and was colorless and transparent. Filaments, formed therefrom, were characterized as having a Y value of 91.2% and a PI value of 99.7% and exhibited excellent luster and whiteness.

Control Example 2

Using only 2 parts of amorphous germanium dioxide as a polycondensation catalyst, i.e. without using antimony acetate and malic acid, a process of Example 27 was repeated with all other conditions remaining the same.

The resultant polymer had an intrinsic viscosity $[\eta]$ of 0.609 and DEG of 1.22%, showing that the side reaction to produce diethylene glycol was not suppressed in comparison with the case of an antimony compound and malic acid being used. Filaments, formed therefrom, were characterized as having a Y value of 91.5% and a PI value of 99.6% and exhibiting excellent luster and whiteness.

Example 28

A mixture of 9,000 parts of dimethyl terephthalate, 1,000 parts of dimethyl isophthalate and 7,500 parts of ethylene glycol, after 10 parts of calcium acetate being added to the mixture at a temperature of 150° C., was heated at temperatures of 150 to 220° C. over a period of 3 hours to perform ester-interchange. An excess of ethylene glycol was distilled off from the reaction product with the temperature being increased. Then, a solution was added to the above reaction product, which solution was prepared by heating a mixture of 4.6 parts of trimethyl phosphate and 100 parts of ethylene glycol at a temperature of 170° C. while methanol, produced therefrom, was distilled off from the reaction mixture, followed by the addition of a catalytic antimony compound solution, prepared as mentioned below, and 0.5 parts of amorphous germanium dioxide. The resultant mixture was vacuumed by degrees with the temperature being gradually increased and finally, polycondensed at a temperature of 285° C. and a pressure of 2 mm. Hg for 1.5 hours.

The catalytic antimony compound solution was prepared as follows: 5.8 parts of citric acid (a molar ratio of the acid to Sb atom was 1/1) was added to a solution of 7 parts antimony triethoxide (Sb content of which corresponds to 4 parts of antimony trioxide) and followed by the agitation over a period of 5 hours with the temperature being maintained at 150° C.

The resultant polymer had an intrinsic viscosity $[\eta]$ of 0.718 and DEG of 0.63% and was colorless, transparent. Filaments, formed therefrom, were characterized as having a Y value of 90.8% and a PI value of 99.5% and exhibiting excellent luster and whiteness.

In the case where the above polycondensation was performed in the absence of only amorphous germanium dioxide for comparison purposes, the resultant polymer had an intrinsic viscosity $[\eta]$ of 0.626 and DEG of 0.60%. Filaments, formed therefrom, were characterized as having a Y value of 87.2% and a PI value of 98.4% and a very slight yellow tinge.

Example 29

10,000 parts of dimethyl terephthalate and 7,500 parts of ethylene glycol were heated at tempreatures of 150 to 220° C. under an atmosphere of nitrogen in the presence of 6 parts of magnesium acetate, while methanol, produced therefrom, was continuously distilled from the reaction, to perform ester-interchange. The reaction was completed 3 hours after its initiation. After an excess of ethylene glycol was distilled off from the reaction product with the temperature being increased, a solution was added to the above reaction product, which solution was prepared by treating 3.2 parts of trimethyl phosphate with 100 parts of ethylene glycol at a temperature of 175° C. while methanol, produced therefrom, was distilled from the reaction mixture. Further, a catalytic antimony compound solution prepared as mentioned below, was added to the reaction product. The resultant mixture was vacuumed by degrees and finally, polycondensed at a temperature of 280° C. and a pressure of 2 mm. Hg for 2 hours.

The catalytic antimony compound solution was prepared as follows: 4.2 parts of an eutectic mixture, prepared from 2 parts of antimony trioxide and 0.4 part of germanium dioxide was dissolved in 150 parts of ethylene glycol. Then, a solution of 3 parts malic acid (a molar ratio of the acid to Sb atom was 0.8/1 dissolved in 50 parts of ethylene glycol at room temperature was added to the solution followed by agitation for 5 hours with the temperature being maintained at 120° C.

The resultant polymer had an intrinsic viscosity $[\eta]$ of 0.771 and DEG of 0.62% and was colorless and transparent. Filaments, formed therefrom, were characterized as having a Y value of 90.3% and a PI value of 99.4% and exhibiting excellent luster and whiteness.

Example 30

Using 4.2 parts of antimony trioxide in place of the eutectic mixture in Example 29, a process of Example 29 was repeated with all other conditions remaining the same.

The resultant polymer had an intrinsic viscosity $[\eta]$ of 0.724 and DEG of 0.60% and was tinged slightly yellow but with little or no darkening. Filaments formed therefrom, were characterized as having a Y value of 86.8% and a PI value of 98.4% and a slightly yellow tinge in comparison with those in Example 29.

Example 31

10,000 parts of dimethyl terephthalate and 7,500 parts of ethylene glycol were heated at temperatures of 150 to 220° C. under an atmosphere of nitrogen in the presence of 6 parts of magnesium acetate, while methanol, thus produced therefrom, was continuously distilled off from the reaction mixture, to perform ester-interchange. The reaction was completed 3 hours after its initiation. Then, an excess of ethylene glycol was distilled off from the reaction product with the temperature being increased. A solution of 3.2 parts trimethyl phosphate in ethylene glycol was then added to the reaction product at a temperature of 240° C. followed by the addition of a catalytic antimony compound solution, prepared as mentioned below. The resultant mixture was vacuumed by degrees and finally, polycondensed at a temperature of 285° C. and a pressure of 2 mm. Hg for 2 hours.

The catalytic antimony compound solution was prepared by adding 5 parts of dimethylmaleic acid (a molar ratio of the acid to Sb atom was 1/1) to a solution of 5 parts antimony trioxide in 200 parts of ethylene glycol and then stirring the mixture for 5 hours with the temperature being maintained at 120° C.

The resultant polymer had an intrinsic viscosity $[\eta]$ of 0.766 and a melting point of 262° C. and exhibited excellent luster and was extremely light with a very slightly yellow tinge but little or no darkening. Filaments, formed therefrom, were characterized as having a Y value of 88.7% and a PI value of 98.6% and exhibiting excellent luster and whiteness.

Example 32

A process of Example 31 was repeated under the same conditions as those in Example 31 except for added amounts of dimethylmaleic acid being 2.5 parts (a molar ratio of the acid to Sb atom was ½) in place of 5 parts.

The resultant polymer had an intrinsic viscosity $[\eta]$ of 0.742 and a melting point of 261° C. and exhibited superior whiteness with little or no yellow tinge. Filaments, formed therefrom, were characterized as having a Y value of 87.0% and a PI value of 98.8% and excellent luster and whiteness.

Example 33

A process of Example 31 was repeated under the same conditions as those in Example 31 except for added amounts of dimethylmaleic acid being 10 parts (a molar ratio of the acid to Sb atom was 2/1) in place of 5 parts.

The resultant polymer had an intrinsic viscosity $[\eta]$ of 0.762 and a melting point of 260° C. and was tinged slightly yellow but little or no darkening. Filaments formed therefrom, were characterized as having a Y value of 88.1% and a PI value of 97.8% and exhibiting excellent lightness and luster.

Control Example 3

A process of Example 31 was repeated under the same conditions as those in Example 31 except for added amounts of dimethylmaleic acid being 25 parts (a molar ratio of the acid to Sb atom was 5/1) in place of 5 parts.

The resultant polymer had an intrinsic viscosity $[\eta]$ of 0.758 and a melting point of 259° C. and was tinged with little or no darkening but with considerably yellow. Filaments, formed therefrom, were characterized as having a Y value of 85.1% and a PI value of 96.2% and being light and lustrous with a considerably yellow tinge.

Example 34

10,000 parts of dimethyl terephthalate and 7,500 parts of ethylene glycol were heated at temperatures of 150 to 220° C. under an atmosphere of nitrogen in the presence of magnesium acetate, while methanol, produced therefrom, was continuously distilled off from the reaction mixture, to perform ester-interchange. The reaction was completed 3 hours after its initiation. Then, an excess of ethylene glycol was distilled off from the reaction product with the temperature being increased. A solution of 3.2 parts trimethyl phosphate in ethylene glycol was then added to the reaction product at a temperature of 240° C. followed by the addition of a catalytic antimony compound solution, prepared as mentioned below. The resultant mixture was vacuumed by degrees and finally, polycondensed at a temperature of 285° C. and a pressure of 2 mm. Hg for 2 hours.

The catalytic antimony compound solution was prepared by adding 4 parts of maleic acid (a molar ratio of the acid to Sb atom was 1/1) to a solution of 5 parts antimony trioxide dissolved in 200 parts of ethylene glycol by heating and then stirring the mixture for 5 hours with the temperature being maintained at 120° C.

The resultant polymer had an intrinsic viscosity $[\eta]$ of 0.767 and melting point of 260° C. and exhibited excellent luster and was extremely light with a very slight yellow tinge but little or no darkening. Filaments, formed therefrom, were characterized as having a Y value of 87.7% and a PI value of 98.7% and exhibitng excellent luster and whiteness.

Example 35

A process of Example 34 was repeated under the same conditions as those in Example 34 except for added amounts of maleic acid being 8 parts (a molar ratio of the acid to Sb atom was 2/1) in place of 4 parts.

The resultant polymer had an intrinsic viscosity $[\eta]$ of 0.756 and a melting point of 260° C. and was tinged slightly yellow but with little or no darkening. Filaments formed therefrom, were characterized as having a Y value of 85.8% and a PI value of 97.7% and exhibiting extreme lightness with a slightly yellow tinge.

Example 36

Using 10.3 parts of antimony acetate (Sb content of which corresponds to 5 parts of $Sb_2O_3$ and a molar ratio of maleic acid to Sb atom is 1/1) in place of antimony trioxide, a process of Example 34 was repeated with all other conditions remaining the same.

The resultant polymer had an intrinsic viscosity $[\eta]$ of 0.778 and a melting point of 260.5° C. and was transparent with a slightly yellow tinge but little or no darkening. Filaments formed therefrom, were characterized as having a Y value of 88.1% and a PI value of 98.6%.

Example 37

10,000 parts of dimethyl terephthalate and 7,500 parts of ethylene glycol were heated at temperatures of 150 to 220° C. under an atmosphere of nitrogen in the presence of 6 parts of magnesium acetate, while methanol, produced therefrom, was continuously distilled off from the mixture, to perform ester-interchange. The reaction was completed 3 hours after its initiation. Then, an excess of ethylene glycol was distilled off from the reaction product with the temperature being increased. A solution of 3.2 parts trimethyl phosphate in ethylene glycol was then added to the reaction product at a temperature of 240° C. and followed by the addition of a catalytic antimony compound solution, prepared as follows: 4 parts of fumaric acid (a molar ratio of the acid to Sb atom is 1/1) was added to a solution of 5 parts antimony trioxide dissolved in 200 parts of ethylene glycol by heating and followed by the agitation over a period of 5 hours with the temperature being maintained at 120° C. The resultant mixture was vacuumed by degrees and finally, polycondensed at a temperature of 285° C. and a pressure of 2 mm. Hg for 2 hours.

The resultant polymer had an intrinsic viscosity $[\eta]$ of 0.775 and a melting point of 261° C. and exhibited excellent luster and was extremely light with a very slight yellow tinge but little or no darkening. Filaments formed therefrom, were characterized as having a Y value of 89.4% and a PI value of 98.9% and exhibiting excellent luster and whiteness.

Example 38

Using 10.3 parts of antimony acetate (Sb content of which corresponds to 5 parts of $Sb_2O_3$) in place of antimony trioxide and 5 parts of dimethylfumaric acid (a molar ratio of the acid to Sb atom is 1/1) in place of fumaric acid, a process of Example 37 was repeated with all other conditions remaining the same.

The resultant polymer had an intrinsic viscosity $[\eta]$ of 0.772 and a melting point of 261° C. and was transparent with a very slight yellow tinge but little or no darkening. Filaments formed therefrom, were characterized as having a Y value of 89.4% and a PI value of 98.8% and exhibiting excellent luster and whiteness.

Example 39

10,000 parts of dimethyl terephthalate and 7,500 parts of ethylene glycol were heated at temperatures of 150 to 220° C. under an atmosphere of nitrogen in the presence of 6 parts of magnesium acetate, while methanol, produced therefrom, was distilled off from the reaction mixture, to perform esterinterchange. The reaction was completed 3 hours after its initiation. Then, an excess of ethylene glycol was distilled off from the reaction product with the temperature being increased. A solution of 3.2 parts trimethyl phosphate in ethylene glycol was then added to the reaction product at a temperature of 240° C. and followed by the addition of a catalytic antimony compound solution, prepared as follows; 4.45 parts of itaconic acid (a molar ratio of the acid to Sb atom is 1/1) was added to a solution of 5 parts antimony trioxide dissolved in 200 parts of ethylene glycol by heating and followed by the agitation over a period of 5 hours with the temperature being maintained at a temperature of 120° C. The resultant mixture was vacuumed by degrees and finally, polycondensed at a temperature of 285° C. and a pressure of 2 mm. Hg for 2 hours.

The resultant polymer had an intrinsic viscosity $[\eta]$ of 0.772 and a melting point of 260.5° C. and exhibited excellent luster and was extremely light with a very slight yellow tinge but little or no darkening. Filaments formed therefrom, where characterized as having a Y value of 87.5% and a PI value of 98.8% and exhibiting excellent luster and whiteness.

Example 40

A process of Example 39 was repeated under the same conditions as those in Example 39 except for added amounts of itaconic acid was 8.9 parts (a molar ratio of the acid to Sb atom is 2/1) in place of 4.45 parts.

The resultant polymer had an intrinsic viscosity $[\eta]$ of 0.745 and a melting point of 260° C. and was tinged slightly yellow but little or no darkening. Filaments formed therefrom, were characterized as having a Y value of 86.0% and a PI value of 98.2% and exhibiting high lightness with a very slight yellow tinge.

Example 41

Using 10.3 parts of antimony acetate (Sb content of which corresponds to 5 parts of $Sb_2O_3$) in place of antimony trioxide and 4 parts of succinic acid (a molar ratio of the acid to Sb atom is 1/1) in place of itaconic acid, a process of Example 39 was repeated with all other conditions remaining the same.

The resultant polymer had an intrinsic viscosity $[\eta]$ of 0.766 and a melting point of 260° C. and was transparent with a slight yellow tinge but little or no darkening. Filaments formed therefrom, were characterized as having a Y value of 86.4% and a PI value of 99.0% and exhibiting extreme lightness with a very slight yellow tinge.

Example 42

Using 8.8 parts of antimony triethoxide in place of antimony trioxide and 5.9 parts of cyclohexane-1,2-dicarboxylic acid (a molar ratio of the acid to Sb atom is 1/1) in place of itaconic acid, a process of Example 39 was repeated with all other conditions remaining the same.

The resultant polymer had an intrinsic viscosity $[\eta]$ of 0.768 and a melting point of 261° C. and exhibited excellent whiteness with little or no yellow tinge. Filaments formed therefrom, where characterized as having a Y value of 87.8% and a PI value of 98.9% and exhibiting luster and whiteness.

Example 43

A mixture of 9,000 parts dimethyl terephthalate, 1,000 parts of dimethyl isophthalate and 7,500 parts of ethylene glycol were heated at temperatures of 150 to 220° C. for 3 hours in the presence of 5 parts of calcium acetate to perform ester-interchange. An excess of ethylene glycol was distilled off from the reaction product with the temperature being further increased. A solution of 2.3 parts trimethyl phosphate was added to the product at a temperature of 240° C. followed by the addition of a catalytic antimony compound solution, which was prepared by adding 3 parts of cyclobutane-1,2-dicarboxylic acid (a molar ratio of the acid to Sb atom is 1/1) to a solution of 6.2 parts of antimony acetate dissolved in 150 parts of ethylene glycol by heating. The resultant mixture was vacuumed by degrees with the temperature being increased and finally, polycondensed at a temperature of 285° C. and a pressure of 2 mm. Hg for 2 hours.

The resultant polymer had an intrinsic viscosity $[\eta]$ of 0.686 and exhibited excellent whiteness and transparency. Filaments formed therefrom, were characterized as having a Y value of 89.1% and a PI value of 99.2%.

For comparison purposes, polycondensation, mentioned above, was repeated without using cyclobutane-1,2-dicarboxylic acid. The resultant polymer was tinged with dark grey.

Example 44

Using 4.5 parts of oxalacetic acid (a molar ratio of the acid to Sb atom is 1/1) in place of itaconic acid, a process of Example 39 was repeated with all other conditions remaining the same.

The resultant polymer had an intrinsic viscosity $[\eta]$ of 0.776 and a melting point of 260.5° C. and was clear with a very slight yellow tinge but little or no darkening. Filaments formed therefrom, were characterized as having a Y value of 87.7% and a PI value of 98.6% and excellent luster and whiteness.

Example 45

Using 5.56 parts of ethoxysuccinic acid (a molar ratio of the acid to Sb atom is 1/1) in place of itaconic acid, a process of Example 39 was repeated with all other conditions remaining the same.

The resultant polymer had an intrinsic viscosity $[\eta]$ of 0.764 and a melting point of 261° C. and little or no darkening. Filaments obtained therefrom, were characterized as having a Y value of 88.1% and a PI value of 98.8% and exhibiting excellent luster and whiteness.

Example 46

10,000 parts of dimethyl terephthalate and 7,500 parts of ethylene glycol were heated at temperatures of 150 to 220° C. under an atmosphere of nitrogen in the presence of 6 parts of magnesium acetate, while methanol, produced therefrom, was continuously distilled off from the mixture, to perform ester-interchange. The reaction was completed 3 hours after its initiation. Then, an excess of ethylene glycol was distilled off from the reaction product with the temperature being increased. A solution of 3.2 parts trimethyl phosphate in ethylene glycol was then added to the reaction product at a temperature of 240° C. followed by the addition of a catalytic antimony compound solution, which was prepared as follows; 5.7 parts of phthalic acid (a molar ratio of the acid to Sb atom is 1/1) was added at room temperature to a solution of 5 parts antimony trioxide dissolved in 200 parts of ethylene glycol by heating followed by agitation over a period of 5 hours with the temperature being maintained at 150° C. The resultant mixture was vacuumed by degrees and finally, polycondensed at a temperature of 285° C. and a pressure of 2 mm. Hg for 2 hours.

The resultant polymer had an intrinsic viscosity $[\eta]$ of 0.772 and a melting point of 261° C. and was tinged with a little darkening. Filaments obtained therefrom, were characterized as having a Y value of 84.4% and a PI value of 99.0% and exhibiting excellent luster.

Examples 47–54

Using various compounds, which have the structure of at least one oxygen atom of the hydroxyl and the carboxyl groups in α-hydroxycarboxylic acid being substituted with a sulfur atom, in place of malic acid, processes of Example 1 were repeated with all other conditions remaining the same. Characteristics of the resultant polymers are shown in Table 2.

From Table 2, it is apparent that all the inventive processes result in polymers having excellent transparency and whiteness with considerably reduced darkening with high productivity, in comparison with a process wherein the most popular one among antimony catalysts, i.e. antimony trioxide, is used alone.

TABLE 2

| Example number | Compound (A) | Used amounts of compound (A) (parts) | $[\eta]$ | M.P. (°C.) | Percent Y value | Percent PI value |
|---|---|---|---|---|---|---|
| 47 | $(C_6H_5)_2$–C(SH)–COOH | 8.35 | 0.766 | 261 | 87.8 | 98.6 |
| 48 | $C_6H_5$CH(SH)–COOH | 5.75 | 0.751 | 261 | 86.8 | 98.9 |
| 49 | HOCOCH$_2$–C(CH$_3$)(SH)–COOH | 5.65 | 0.749 | 261 | 88.4 | 98.7 |
| 50 | HOCOCH$_2$CH$_2$CH(SH)–COOH | 5.62 | 0.755 | 260.5 | 87.2 | 98.7 |
| 51 | HSCH$_2$CH(SH)–COOH | 4.72 | 0.744 | 261 | 86.6 | 98.6 |
| 52 | HOCOCH(SH)–CH(SH)–COOH | 6.23 | 0.752 | 262 | 87.3 | 98.8 |
| 53 | $(HOCOCH_2)_2$C(SH)–COOH | 7.12 | 0.762 | 261 | 88.7 | 98.7 |
| 54 | HSCH$_2$COOH | 3.15 | 0.742 | 260 | 85.8 | 98.8 |

Examples 55–61

Using various compounds, which have the structure of at least one oxygen atom of the carboxyl group in α,β-dicarboxylic acid being substituted with a sulfur atom, in place of malic acid, processes of Example 1 were repeated with all other conditions remaining the same.

Results are shown in Table 3, from which it is apparent that all the inventive processes result in polymers having excellent transparency and whiteness with considerably reduced darkening with high productivity, in comparison with a conventional process wherein the most popular one among antimony catalysts, i.e. antimony trioxide, is used alone.

TABLE 3

| Example number | Compound (A) | Used amounts of compound (A) (parts) | $[\eta]$ | M.P. (°C.) | Percent Y value | Percent PI value |
|---|---|---|---|---|---|---|
| 55 | HOCOCH(CHCOSH) | 4.52 | 0.738 | 260.5 | 87.6 | 99.0 |
| 56 | CH(COOH)=CH(COSH) | 5.42 | 0.740 | 260 | 86.8 | 98.8 |
| 57 | CH$_2$=C(COOH)–CH$_2$–COSH | 5.00 | 0.753 | 261.5 | 88.7 | 98.6 |
| 58 | C$_6$H$_4$(COSH)(COOH) | 6.23 | 0.739 | 261 | 85.9 | 98.2 |
| 59 | C$_2$H$_5$O–CH(COOH)–CH$_2$–COSH | 6.10 | 0.749 | 260.5 | 87.9 | 98.3 |
| 60 | C$_6$H$_5$–CH(COOH)–CH=COSH | 7.19 | 0.751 | 260.5 | 87.3 | 98.3 |
| 61 | CH$_3$CHCOSH–CH$_3$CHCOSH | 6.10 | 0.755 | 261 | 86.8 | 98.7 |

Examples 62-71

Using various derivatives of α-hydroxycarboxylic acid in place of malic acid, processes of Example 1 were repeated with all other conditions remaining the same.

Results are shown in Table 4, from which it is apparent that all the inventive processes result in polymers having excellent transparency and whiteness with considerably reduced darkening with high productivity, in comparison with a conventional process wherein the most popular one among antimony catalysts, i.e. antimony trioxide, is used alone.

Examples 72-80

Using various derivatives of α,β-dicarboxylic acid in place of malic acid, processes of Example 1 were repeated with all other conditions remaining the same.

Results are shown in Table 5, from which it is apparent that all the inventive processes result in polymers having excellent transparency and whiteness with considerably reduced darkening with high productivity, in comparison with a conventional process wherein the most popular one among antimony catalysts, i.e. antimony trioxide, is used alone.

TABLE 4

| Example number | Compound (A) | Used amounts of compound (A) (parts) | $(\eta)$ | M.P. (°C.) | Percent Y value | PI value |
|---|---|---|---|---|---|---|
| 62 | $(C_6H_5)_2C(OH)COOCH_2CH_2OH$ | 9.3 | 0.753 | 260 | 88.3 | 98.7 |
| 63 | $HOCH_2CH_2OCOCH_2CH(OH)-COOCH_2CH_2OH$ | 7.6 | 0.755 | 260 | 89.1 | 98.8 |
| 64 | $HOCH_2CH(OH)-COOCH_2CH_2OH$ | 5.13 | 0.747 | 261 | 88.8 | 98.9 |
| 65 | $(C_2H_5OCOCH_2)_2C(OH)-COOC_2H_5$ | 6.48 | 0.740 | 261 | 87.9 | 98.7 |
| 66 | $C_2H_5OCOCH_2CH(OH)-CH(OH)-COOC_2H_5$ | 7.55 | 0.744 | 260 | 88.0 | 98.8 |
| 67 | $(C_6H_5)(C_6H_5CH_2)C(OH)-CONH_2$ | 8.25 | 0.739 | 260 | 87.3 | 98.4 |
| 68 | $(C_6H_5)_2-C(OH)-CONH_2$ | 7.77 | 0.742 | 260 | 87.7 | 98.8 |
| 69 | $C_6H_5CH(OH)-COOCOCH_3$ | 6.65 | 0.749 | 261 | 88.1 | 98.7 |
| 70 | $(C_6H_{11})(C_6H_5)C(OH)-COCl$ | 8.6 | 0.742 | 261 | 87.3 | 98.8 |
| 71 | $ClCOCH(OH)-CH(OH)-COCl$ | 6.4 | 0.747 | 260 | 86.8 | 98.8 |

TABLE 5

| Example number | Compound (A) | Used amounts of compound (A) (parts) | $[\eta]$ | M.P. (°C.) | Percent Y value | PI value |
|---|---|---|---|---|---|---|
| 72 | maleic anhydride (H-C-CO-O-CO-C-H) | 3.36 | 0.746 | 261 | 88.8 | 98.6 |
| 73 | itaconic anhydride ($CH_2=C-CO-O-CO-CH_2$) | 3.84 | 0.747 | 261 | 87.4 | 98.8 |
| 74 | $C_2H_5O-CH-CO-O-CO-CH_2$ (cyclic) | 4.94 | 0.755 | 260 | 87.8 | 98.7 |
| 75 | $CH(COOCOCH_3)=CH(COOCOCH_3)$ | 6.85 | 0.742 | 260 | 88.2 | 98.7 |
| 76 | $HOCH_2CH_2OCOCH=CH-COOH$ | 5.48 | 0.743 | 260 | 87.4 | 98.6 |
| 77 | phthalic acid mono(2-hydroxyethyl) ester ($C_6H_4$(COOCH$_2$CH$_2$OH)(COOH)) | 7.2 | 0.739 | 261 | 86.0 | 98.8 |
| 78 | $C_6H_5-C(CONH_2)=C(COOH)-C_6H_5$ | 9.14 | 0.737 | 260 | 86.6 | 98.6 |

TABLE 5—Continued

| Example number | Compound (A) | Used amount of compound (A) (parts) | [η] | M.P. (°C.) | Percent Y value | PI value |
|---|---|---|---|---|---|---|
| 79 | $CH_2=C-COCl$<br>$\|$<br>$CH_2COCl$ | 5.72 | 0.744 | 261 | 86.9 | 98.8 |
| 80 | $C_6H_{11}CH-COCl$<br>$\|$<br>$CH_2-COCl$ | 8.11 | 0.737 | 260 | 87.2 | 98.8 |

Examples 81–85

Using various derivatives of the compound, which compound has the structure of at least one oxygen atom of the hydroxyl and the carboxyl groups in α-hydroxycarboxylic acid being substituted with a sulfur atom(s), in place of malic acid, processes of Example 1 were repeated with all other conditions remaining the same.

Results are shown in Table 6, from which it is apparent that all the inventive processes result in polymers having excellent transparency and whiteness with considerably reduced darkening with high productivity, in comparison with a conventional process wherein the most popular one among antimony catalysts, i.e. antimony trioxide, is used alone.

TABLE 6

| Example number | Compound (A) | Used amounts of compound (A) (parts) | [η] | M.P. (°C.) | Percent Y value | PI value |
|---|---|---|---|---|---|---|
| 81 | $(C_6H_5)_2C-COOCH_2CH_2OH$<br>$\|$<br>$SH$ | 9.87 | 0.747 | 261 | 87.8 | 98.5 |
| 82 | $CH_3OCOCH_2CHCOOCH_2CH_2OH$<br>$\|$<br>$SH$ | 7.13 | 0.743 | 260 | 87.1 | 98.7 |
| 83 | $(C_6H_5)_2C-COSC_6H_5$<br>$\|$<br>$SH$ | 11.5 | 0.741 | 261 | 86.8 | 98.7 |
| 84 | $CH_3OCOCH_2CH-CONH_2$<br>$\|$<br>$SH$ | 5.58 | 0.747 | 261 | 87.2 | 98.7 |
| 85 | $ClCOCH_2CH_2CH-COCl$<br>$\|$<br>$SH$ | 6.88 | 0.743 | 261 | 88.0 | 98.7 |

Examples 86–91

Using various derivatives of the compound, which have the structure of at least one oxygen atom of the carboxyl group in α,β-dicarboxylic acid being substituted with a sulfur atom(s), in place of malic acid, processes of Example 1 were repeated with all other conditions remaining the same. Results are shown in Table 7.

TABLE 7

| Example number | Compound (A) | Used amounts of compound (A) (parts) | [η] | M.P. (°C.) | Percent Y value | PI value |
|---|---|---|---|---|---|---|
| 86 | $CH-CO$<br>$\|\|\quad\quad\searrow S$<br>$CH-CO$ | 3.9 | 0.750 | 261 | 88.3 | 98.7 |
| 87 | $CH=C-CO$<br>$\quad\quad\|\quad\searrow S$<br>$\quad\quad CH_2CO$ | 4.38 | 0.746 | 261 | 87.8 | 98.8 |
| 88 | $C_6H_5CH-CO$<br>$\quad\quad\|\quad\searrow S$<br>$\quad\quad CH_2CO$ | 6.44 | 0.750 | 261 | 87.1 | 98.9 |
| 89 | $C_6H_5SCOCH$<br>$\quad\quad\|\|$<br>$\quad\quad CHCOSH$ | 7.67 | 0.739 | 260 | 86.9 | 98.7 |
| 90 | $CH_2=C-COSCH_2CH_2OCH_3$<br>$\|$<br>$CH_2-COSCH_2CH_2OCH_3$ | 9.52 | 0.744 | 261 | 87.4 | 98.7 |
| 91 | $CH_3C-CONH_2$<br>$\|\|$<br>$CH_3C-COSH$ | 5.45 | 0.740 | 261 | 86.6 | 98.6 |

Examples 92-96

Process of Example 1 were repeated under the same conditions as those in Example 1 except that an antimony compound solution, which was prepared by adding an organic acid to a solution of 5 parts antimony trioxide dissolved in 200 parts of ethylene glycol by heating followed by agitation with the temperature being maintained at 100° C. for 3 hours, and a cobalt compound were successively added to the reaction mixture. Results are shown in Table 8, from which it is apparent that use of both antimony and cobalt compounds results in polymers having a higher PI value, i.e. more improved whiteness without a yellow tinge.

atom of the hydroxyl group and the carboxyl group of α-carboxylic acid selected from glycollic acid, α-hydroxystearic acid, α-hydroxyvaleric acid, α-hydroxyisobutyric acid and α-hydroxylauric acid.

4. A process for preparing linear polyesters comprising condensing glycol terephthalate in the presence of an antimony-containing polycondensation catalyst which is soluble in the polycondensation system and sulfur-containing derivative of α,β-dicarboxylic acid having 4 to 30 carbon atoms which has been prepared by substitution of at least one sulfur atom for at least one oxygen atom of the carboxyl groups of α,β-dicarboxylic acid selected from the

TABLE 8

| Example number | Organic acid and its used amounts (parts) | Cobalt compound and its used amounts (parts) | [η] | M.P. (° C.) | Percent Y value | PI value |
|---|---|---|---|---|---|---|
| 92 | HOOC—CH(OH)—CH$_2$—COOH (4.6) | Cobalt acetate (0.2) | 0.732 | 261 | 89.7 | 99.7 |
| 93 | (C$_6$H$_5$)$_2$C(OH)—COOH (7.8) | do | 0.745 | 261 | 88.7 | 99.8 |
| 94 | CH—COOH ‖ CH—COOH (3.97) | Cobalt acetate (0.3) | 0.746 | 261 | 89.8 | 100.0 |
| 95 | HOCOCH$_2$CH(SH)—COOH (5.14) | do | 0.743 | 261 | 88.7 | 99.5 |
| 96 | HOCH$_2$—C(CH$_3$)(OH)—COOH (4.11) | Cobalt chloride (0.5) | 0.742 | 261 | 88.8 | 99.7 |

What we claim is:

1. A process for preparing linear polyesters comprising condensing glycol terephthalate in the presence of an antimony-containing polycondensation catalyst which is soluble in the polycondensation system and sulfur-containing derivative of α-hydroxycarboxylic acid having 2 to 30 carbon atoms which has been prepared by substitution of at least one sulfur atom for at least one oxygen atom of the hydroxyl group or the carboxyl group of α-hydroxycarboxylic acid having a total of at least three hydroxyl and carboxyl groups or having at least one aromatic ring in the α-position in relation to the carboxyl group.

2. A process for preparing linear polyesters comprising condensing glycol terephthalate in the presence of an antimony-containing polycondensation catalyst which is soluble in the polycondensation system and sulfur-containing derivative of α-hydroxycarboxylic acid having 2 to 30 carbon atoms which has been prepared by substitution of at least one sulfur atom for at least one oxygen atom of the hydroxyl group or the carboxy group of α-hydroxycarboxylic acid selected from tartaric acid, α-methyltartaric acid, citric acid, malic acid, α-methylmalic acid, trimethylmaleic acid, α-hydroxy-α'-methylsuccinic acid, α-hydroxy-α,α'-dimethylsuccinic acid, α-hydroxyglutaric acid, glyceric acid, 4-hydroxypentane-1,3,4-tricarboxylic acid, α,β-dihydroxyisobutyric acid, α,β-dihydroxyglutaric acid, dihydroxyfumaric acid, gluconic acid, 2,3,4-trihydroxybutyric acid, tartronic acid, methyltartronic acid, benzilic acid and α-phenyllactic acid.

3. A process for preparing linear polyesters comprising condensing glycol terephthalate in the presence of an antimony-containing polycondensation catalyst which is soluble in the polycondensation system and sulfur-containing derivative of α-hydroxycarboxylic acid having 2 to 30 carbon atoms which has been prepared by substitution of at least one sulfur atom for at least one oxygen group consisting of the compounds represented by the following formulae:

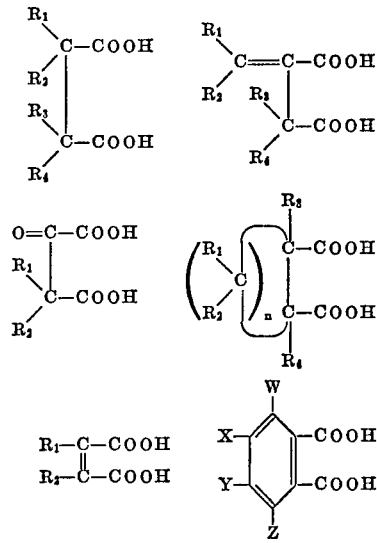

wherein $R_1$, $R_2$, $R_3$ and $R_4$ are identical with or different from each other and are hydrogen atom or substituted or unsubstituted alkyl, cycloalkyl, aryl, aralkyl, allyl or alkoxyl group, said substituted groups having a substituent selected from carbonyl group, halogen and carboxyl group; W, X, Y and Z are identical with or different from each other and are hydrogen atom or alkyl, hydroxyl or carboxyl group; and n is an integer of at least 1.

5. A process according to claim 4, wherein said sulfur-containing derivative of α,β-dicarboxylic acid having 4 to 30 carbon atoms is the one which has been prepared by substitution of at least one sulfur atom for at least one oxygen atom of the carboxyl groups of α,β-dicarboxylic acid selected from maleic acid, dimethylmaleic acid, diethylmaleic acid, phenylmaleic acid, fumaric acid, succinic acid, methylsuccinic acid, α-ethoxysuccinic acid, 2,3-dimethylsuccinic acid, itaconic acid, cyclohexane-1,2-dicarboxylic acid, cyclohexane-1,2-dicarboxylic acid, oxalcyclobutane-1,2-dicarboxylic acid, cyclopentane-1,2-dicarboxylic acid, cyclohexane-1,2-dicarboxylic acid, oxalacetic acid, phthalic acid, cyclobutane-1,2-dicarboxylic acid and 1-butene-2,3,4-tricarboxylic acid.

6. A process for preparing linear polyesters comprising condensing glycol terephthalate in the presence of an antimony-containing polycondensation catalyst which is soluble in the polycondensation system and ester, amide, acid anhydride, mixed acid anhydride or acid halide prepared from (1) α-hydroxycarboxylic acid having 2 to 30 carbon atoms selected from tartaric acid, α-methyltartaric acid, citric acid, malic acid, α-methylmalic acid, trimethylmaleic acid, α-hydroxy-α'-methylsuccinic acid, α-hydroxy-α,α'-dimethylsuccinic acid, α-hydroxyglutaric acid, glyceric acid, 4-hydroxypentane-1,3,4-tricarboxylic acid, α,β-dihydroxyisobutyric acid, α,α-dihydroxyglutaric acid, dihydroxyfumaric acid, gluconic acid, 2,3,4-trihydroxybutyric acid, tartronic acid, methyltartronic acid, benzilic acid and α-phenyllactic acid, or (2) a sulfur-containing derivative having been prepared by substitution of at least one sulfur atom for at least one oxygen atom of the hydroxyl group or the carboxyl group of α-hydroxycarboxylic acid having 2 to 30 carbon atoms selected from the above-listed acids.

7. A process for preparing linear polyesters comprising condensing glycol terephthalate in the presence of an antimony-containing polycondensation catalyst which is soluble in the polycondensation system and ester, amide, acid ahydride, mixed acid anhydride or acid halide prepared from (1) α-hydroxycarboxylic acid having 2 to 30 carbon atoms selected from glycollic acid, α-hydroxystearic acid, α-hydroxyvaleric acid, α-hydroxyisobutyric acid and α-hydroxy-lauric acid, or (2) a sulfur-containing derivative having been prepared by substitution of at least one sulfur atom for at least one oxygen atom of the hydroxyl group and the carboxyl group of α-carboxylic acid having 2 to 30 carbon atoms selected from the above-listed acids.

8. A process for preparing linear polyesters comprising condensing glycol terephthalate in the presence of an antimony-containing polycondensation catalyst which is soluble in the polycondensation system ad ester, amide, acid anhydride, mixed acid anhydride or acid halide prepared from (1) α-hydroxycarboxylic acid having 2 to 30 carbon atoms selected from maleic acid, dimethylmaleic acid, diethylmaleic acid, phenylmaleic acid, fumaric acid, succinic acid, methylsuccinic acid, α-ethoxysuccinic acid, 2,3-dimethylsuccinic acid, itaconic acid, cyclohexane-1,2-dicarboxylic acid, 1-phenylcyclopropane-2,3-dicarboxylic acid, cyclobutane-1,2-dicarboxylic acid, cyclopentane-1,2-dicarboxylic acid, cyclohexane-1,2-dicarboxylic acid, oxalacetic acid, phthalic acid, cyclobutane-1,2-dicarboxylic acid and 1-butene-2,3,4-tricarboxylic acid, or (2) a sulfur-containing derivative having been prepared by substitution of at least one sulfur atom for at least one oxygen atom of the carboxyl groups of α,β-dicarboxylic acid having 4 to 30 carbon atoms selected from the above-listed acid.

References Cited

UNITED STATES PATENTS

| | | | |
|---|---|---|---|
| 3,438,944 | 4/1969 | Stewart et al. | 260—75 |
| 3,475,381 | 10/1969 | Price et al. | 260—75 |
| 3,484,410 | 12/1969 | Lazarus et al. | 260—75 |

MELVIN GOLDSTEIN, Primary Examiner

U.S. Cl. X.R.

260—47 C